March 16, 1954   P. A. H. ROUSSEL   2,672,554
ELECTRIC PULSE REGENERATOR
Filed Dec. 3, 1951
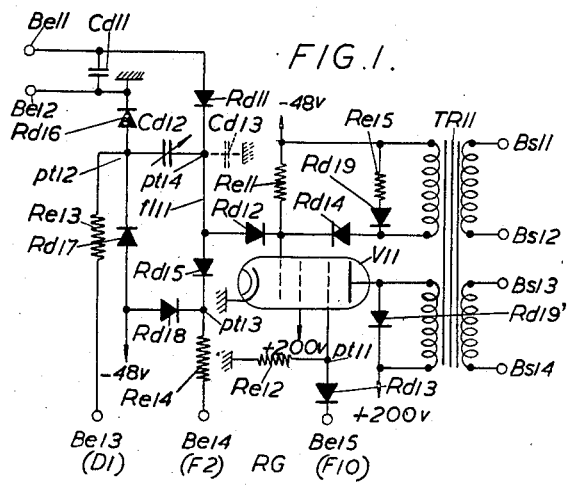
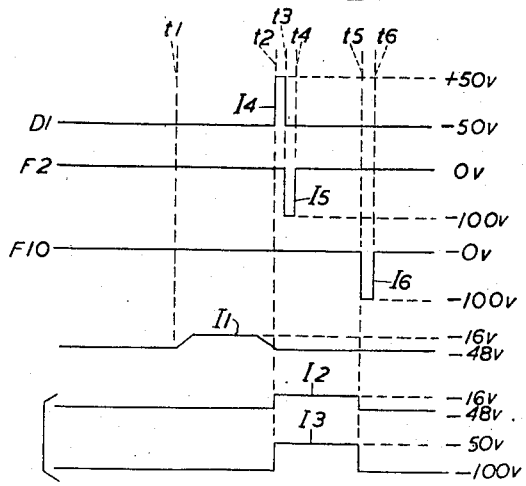
*Inventor*
PAUL A. H. ROUSSEL
*By* Robert Harding Jr.
*Attorney*

Patented Mar. 16, 1954

2,672,554

UNITED STATES PATENT OFFICE 2,672,554

ELECTRIC PULSE REGENERATOR

Paul Antoine Henri Roussel, Paris, France, assignor to International Standard Electric Corporation, New York, N. Y., a corporation of Delaware Application December 3, 1951, Serial No. 259,665

14 Claims. (Cl. 250—27)

1

This invention relates to electric pulse regenerators, i. e., devices which receive more or less distorted pulses and retransmit pulses having the correct shape. In general, the regenerated pulse is out of phase by a certain amount with respect to the orignal pulse, and one of the objects of the invention consists in obtaining a regenerated pulse which is produced only after the original pulse has ended.

One of the features of the invention consists in charging a condenser with the received pulse and feeding to the control grid of a tube the charging voltage of said condenser, in order to prepare said tube for operation, means being provided to make it operate at a suitable instant and to block it after a certain length of time, the regenerated pulse being obtained from said tube.

Another feature of the invention is based on the fact that the charging voltage of the condenser is fed to the control grid of a vacuum tube in order to prepare this tube for operation, said tube becoming conductive only when there is added to the charging voltage of the condenser a voltage obtained from an auxiliary pulse source, the start of the regenerated pulse then coinciding with the instant said auxiliary source emits a pulse.

Another feature of the invention consists in causing the tube to operate by means of a pulse which is short as compared with the pulse to be regenerated, a feedback circuit being provided for keeping the tube in operation after the short pulse which caused it to operate has ended.

Another feature of the invention consists in using a pentode tube and in blocking said tube by means of an auxiliary pulse source connected to the suppressor grid, the end of the regenerated pulse then coinciding with the instant said auxiliary source emits a pulse.

The pulse regenerator may be used in a number of systems and, in particular, in an electronic selection system such as that described in U. S. patent application Serial No. 168,072, filed June 14, 1950. In this system it is possible to eliminate the regeneration of the pulses in the director, replace it with simple amplification, and provide in the register a regenerator in accordance with the invention, which sends back a regenerated pulse the instant following the one in which the pulse is received.

Fig. 1 shows a pulse regenerator in accordance with the invention;

Fig. 2, a diagram of time-position pulses used in the regenerator of Fig. 1.

2

With reference to Figs. 1 and 2, a detailed description of the pulse regenerator covered by the invention will now be given. Regenerator RG, shown in Fig. 1, has two input terminals Be11, Be12, and a certain number of output terminal pairs Bs11, Bs12, Bs13, Bs14. The pulse to be regenerated is applied to input terminals Be11, Be12 and the regenerated pulses are taken from output terminals Bs11, Bs12—Bs13, Bs14. Several pairs of output terminals have been provided in order to obtain regenerated pulses of various amplitudes. Two pairs of output terminals are shown, but it is obvious that others could have been provided. Terminals Be13, Be14, and Be15 are connected to sources D1, F2, and F10, respectively, which produce the short pulses shown in the diagram of Fig. 2. Source D1 is normally at a potential of −50 volts, but at a given instant $t2$, it produces a positive pulse having a potential of +50 volts. Source F2 is normally at ground potential (taken as reference potential), but at a given instant $t3$ it produces a negative pulse having a potential of −100 volts. Source F10 is normally at ground potential, but at instant $t5$ produces a negative pulse having a potential of −100 volts. These potentials are given by way of example, it being possible to use other potentials. The length of the pulses obtained from sources D1, F2, and F10 is short as compared with the length of the pulse $I_1$ to be regenerated.

The pulse $I_1$ to be regenerated, which may be more or less distorted, is applied to input terminals Be11 and Be12 of regenerator RG. This pulse begins at instant $t1$ and ends at instant $t2$. It raises the potential of terminal Be11 from −48 volts to −16 volts, and condenser Cd11 charges (it will be agreed that said condenser is discharged when its upper terminal has a potential of −48 volts and its lower terminal is at ground potential, and that it is charged when the potential of its upper terminal changes from −48 volts to −16 volts).

When condenser Cd11 is completely charged, the upper terminal of said condenser is therefore raised to a potential of −16 volts. Said condenser Cd11, and the internal impedance of the pulse generator (not shown), have a time constant of the order of magnitude of the length of the pulse to be regenerated.

The potential of the upper terminal of condenser Cd11, i. e., −16 volts, is applied through rectifiers Rd11 and Rd12 to the main control grid of a pentode V11. This tube is so biased that no current flows in its plate circuit when said potential of −16 volts is applied to it. In the example under consideration, the grid is assumed to be biased by a potential of −48 volts, applied through resistance Re11. The screen grid of tube 11 is supplied with a certain potential which, in the example under consideration, is assumed to be 200 volts; the suppressor grid is connected through rectifier Rd13 and terminal Be15 to pulse source F10. At the instant under consideration, namely, when pulse I1 ends and condenser Cd11 is charged, source F10 does not emit any pulse and the suppressor grid of tube V11 is grounded through resistance Re12, on the one hand, and through rectifier Rd13, on the other.

At instant t2, generator D1 emits a short pulse I4 having an amplitude of 100 volts, which is applied through resistance Re13 to the voltage-limiting device consisting of rectifiers Rd16 and Rd17.

Point pt12 of the voltage limiter can neither be brought to a potential greater than ground potential nor to a potential less than −48 volts. If, for some reason or other, the potential of point pt12 became positive, current would flow through rectifier Rd16; and since the forward resistance of said rectifier may be regarded as being negligible, point pt12 would remain at approximately ground potential. Likewise, if, for some reason or other, the potential of point pt12 dropped below −48 volts, current would flow through rectifier Rd17 and said point pt12 would remain at a potential substantially equal to −48 volts. When source D1 emits a pulse having a potential of +50 volts, the potential of point pt12 passes from −48 volts to 0 volt, its two limiting values. Nevertheless, the potential of the right-hand terminal of condenser Cd12 does not increase above −48 volts. Wire fl11 has in fact a certain capacity Cd13 with respect to ground, condensers Cd12, Cd13 then forming, for alternating currents, a capacitive voltage divider. In practice, when generator D1 emits a pulse, the potential of point pt14 increases from −16 to 0 volts, which is sufficient to make tube V11 conducting.

Current then flows through the following circuit: 200-volt plate potential, lower left-hand winding of transformer TR11, plate and cathode of tube V11, ground. A pulse I2 is then obtained from the output terminals Bs11 and Bs12 of transformer TR11, and a pulse I3 from output terminals Bs13 and Bs14. The various windings of transformer TR11 are so designed that the amplitudes of pulses I2 and I3 are different. In the example described, it is assumed that the amplitude of I2 was 32 volts and that of I3, 50 volts.

At the same time, a certain voltage is produced in the upper left-hand winding of transformer TR11. This voltage is applied to the main control grid of the tube V11 through rectifier Rd14, said tube then remaining conductive at instant t3 when pulse I4, sent by generator D1, has ended. Current continues to flow in the plate circuit of tube V11, and pulses I2 and I3 are still obtained from output terminals Bs11, Bs12—Bs13, Bs14.

Condenser Cd12 is a variable condenser. The capacitance of this condenser can be varied so as to adjust the sensitivity of tube V11. In practice, it would be adjusted so that tube V11 operates only when the pulse received at the terminals Be11, Be12 has an amplitude of at least 16 volts.

At instant t3, source F2, which is normally at ground potential, emits a negative pulse I5 having an amplitude of 100 volts. This pulse is applied through terminal Be14 and resistance Re14 to point pt13, but the potential of said point cannot drop below −48 volts because of the voltage limiting device consisting of rectifier Rd18. Condenser Cd11 then discharges over the following circuit: upper terminal of condenser Cd11, rectifiers Rd11 and Rd15 and point pt13 at a potential of −48 volts. Condenser Cd11 is therefore in the same condition as when the regenerator was not operating.

At instant t5, generator F10 emits a short pulse I6, terminal Be15 then being at a potential of −100 volts. Current then flows through the following circuit: ground, resistance Re12, rectifier Rd13 and terminal Be15 at a potential of −100 volts. The forward resistance of rectifier Rd13 is assumed to be negligible with respect to resistance Re12, so junction point pt11 between said resistance and said rectifier is at a potential of −100 volts. The characteristics of tube V11 are such that said tube is cut off; pulses I2 and I3, taken from terminals Bs11, Bs12 and Bs13, Bs14, respectively, then end.

When pulse I6, emitted by generator F10, has ended, the regenerator of Fig. 1 is in the same condition as at the beginning of the operation, and is ready to regenerate another pulse.

It is seen from the above explanation that the regenerated pulses taken from output terminals Bs11 and Bs12—Bs13, Bs14 can begin at any instant, provided condenser Cd11 is fully charged, the leading edge of said pulses depending on the instant source D1 emits a pulse. Likewise, the regenerated pulses can end at any given instant, which depends only on the instant short-pulse source F10 emits a pulse. In particular, it is possible, as in the described example, to provide arrangements whereby the regenerated pulse begins only after the received pulse has completely ended.

Rectifiers Rd12 and Rd14 are provided to prevent any mixing between the circuit feeding the pulses to the main control grid of tube V11 and the feedback circuit enabling the tube to remain conductive. Rectifier Rd14 prevents the discharge current of condenser Cd11 from flowing in the upper left-hand winding of transformer TR11. Rectifier Rd12 prevents the feedback current from returning to condenser Cd11. In like manner, rectifier Rd15 prevents any untimely operation of source F2 when the latter is not emitting pulses.

If it is assumed that the three auxiliary pulse sources D1, F2 and F10 periodically emit the same pulses, the above cycle of operations can be repeated indefinitely.

The devices made up, on the one hand, of resistance Re15 and rectifier Rd19 and, on the other, of rectifier Rd19', are provided to eliminate any parasitic oscillations that might be started when tube V11 is cut off. Said devices short circuit every other half cycle, thus eliminating such parasitic oscillations.

What is claimed:

1. A pulse regenerator comprising an input circuit and an output circuit, means connected to said input circuit for storing a pulse received thereby, means under control of said storing means for causing current to flow in said output circuit at a time subsequent to the storing of said pulse, means controlled by the current in said output circuit for maintaining said current independently of said last mentioned means, and means independent of said current causing means and said current maintaining means for stopping said current at a predetermined time after the operation of said current causing means.

2. A pulse regenerator, as defined in claim 1, in which the means for causing current to flow in the output circuit comprises a thermionic tube having a control electrode connected to the storing means and means for applying a potential to said electrode in addition to any potential which might be applied by said storing means to cause said tube to operate.

3. A pulse regenerator, as defined in claim 2, in which the pulse storing means is a condenser connected to the control electrode of the thermionic tube.

4. A pulse regenerator, as defined in claim 3, in which the means for maintaining the current in the output circuit independently of the means for causing the current flow comprises a transformer in said output circuit having a secondary winding connected to the control electrode and a unidirectional current-carrying device connected between the pulse storing means and said control electrode and poled so as to prevent a drop of potential on said storing means from affecting said electrode.

5. A pulse regenerator, as defined in claim 4, further comprising means for discharging the condenser of the storing means without affecting the operation of the tube.

6. A pulse regenerator, as defined in claim 5, in which the tube has a suppressor electrode and the means for stopping the current at a predetermined time comprises means for applying a negative pulse to said suppressor electrode at a predetermined time after the operation of the current causing means.

7. A pulse regenerator, as defined in claim 6, in which the means for discharging the condenser comprises means for applying a negative pulse across said condenser.

8. A pulse regenerator, as defined in claim 7, further comprising means for preventing oscillations in the secondary winding of the transformer.

9. A pulse regenerator, as defined in claim 1, further comprising means for restoring the storing means to its condition prior to the receipt of an incoming pulse.

10. A pulse regenerator, as defined in claim 1, in which the means for causing current to flow in the output circuit comprises a thermionic tube having a control electrode connected to the input circuit, and an anode connected to the output circuit and means for applying a positive pulse to said electrode in addition to any potential which might be applied by the storing means to cause the tube to operate.

11. A pulse regenerator, as defined in claim 10, in which the pulse storing means is a condenser connected to the control electrode of the thermionic tube and means is provided for discharging said condenser after the operation of the means for causing the current to flow.

12. A pulse regenerator, as defined in claim 11, in which the thermionic tube is provided with a suppressor electrode and the means for stopping the current flow in the output circuit comprises means for applying a negative pulse to said suppressor electrode so as to shut off said tube.

13. A pulse regenerator, as defined in claim 12, in which the means for discharging the condenser without affecting the operation of the tube comprises a unidirectional device connected between the control electrode of said tube and the storing condenser and so poled that a drop in potential at the condenser below that of the control electrode will not affect the potential of the control electrode.

14. A pulse regenerator, comprising a thermionic tube having a cathode, an anode, a control electrode, and a suppressor electrode, means for receiving an incoming pulse, a condenser connected to said means whereby said condenser is charged when a pulse is received, means connected between said control electrode and said condenser and including a unidirectional device being poled so as to permit an increase in potential on said condenser to produce an increase of potential on said control electrode, means for applying to said control electrode through said unidirectional device a positive pulse at a time subsequent to the receipt of an incoming pulse, said positive pulse having a potential which when added to the potential on said condenser will cause the operation of said tube, a transformer having a primary winding connected in the anode-cathode circuit of said tube and at least two secondary windings, means for electrically connecting one of said secondary windings to said control electrode whereby the initiation of current in said anode-cathode circuit will produce a positive potential on said control electrode so as to continue the operation of said tube, means for applying a negative pulse to said suppressor electrode so as to cut off said tube, and means for applying a negative pulse to said condenser to discharge said condenser at a time prior to the operation of said tube.

PAUL ANTOINE HENRI ROUSSEL.

References Cited in the file of this patent
UNITED STATES PATENTS

| Number | Name | Date |
|---|---|---|
| 2,535,285 | Heaton | Dec. 26, 1950 |